United States Patent
Folts et al.

(10) Patent No.: US 6,600,973 B1
(45) Date of Patent: Jul. 29, 2003

(54) METHOD AND APPARATUS FOR PROVIDING POWER TO A UTILITY NETWORK

(75) Inventors: Douglas C. Folts, Baraboo, WI (US); Thomas Gregory Hubert, Necedah, WI (US)

(73) Assignee: American Superconductor Corporation, Westborough, MA (US)

( * ) Notice: Subject to any disclaimer, the term of this patent is extended or adjusted under 35 U.S.C. 154(b) by 0 days.

(21) Appl. No.: 09/449,375

(22) Filed: Nov. 24, 1999

(51) Int. Cl.[7] .............................. G06F 19/00; G05F 5/00
(52) U.S. Cl. ..................... 700/297; 700/293; 307/64; 323/205; 702/59
(58) Field of Search ................. 700/286, 292, 700/293, 294, 295, 297, 298; 323/207, 205; 324/512; 702/58, 59, 60, 64, 65; 307/24, 26, 31, 23, 64, 66, 75, 87, 103; 361/18, 115

(56) References Cited

U.S. PATENT DOCUMENTS

| 3,958,153 | A | * | 5/1976 | Narayan | 361/86 |
|---|---|---|---|---|---|
| 4,110,683 | A | * | 8/1978 | Cason et al. | 324/127 |
| 4,785,405 | A | * | 11/1988 | Hasegawa et al. | 307/102 |
| 4,962,354 | A | | 10/1990 | Visser et al. | 323/360 |
| 5,329,222 | A | * | 7/1994 | Gyugyi et al. | 307/102 |
| 5,644,218 | A | | 7/1997 | Emmerich et al. | 323/360 |
| 5,801,937 | A | * | 9/1998 | Gold et al. | 307/66 |
| 5,883,796 | A | * | 3/1999 | Cheng et al. | 307/105 |
| 5,943,246 | A | * | 8/1999 | Porter | 307/43 |
| 6,118,676 | A | * | 9/2000 | Divan et al. | 323/207 |
| 6,215,202 | B1 | * | 4/2001 | Luongo et al. | 307/23 |
| 6,327,162 | B1 | * | 12/2001 | Larsen et al. | 307/103 |
| 6,360,178 | B1 | * | 3/2002 | Parsons et al. | 702/65 |
| 6,392,856 | B1 | * | 5/2002 | Kehrli et al. | 361/64 |
| 6,414,853 | B2 | * | 7/2002 | Buckles et al. | 363/14 |
| 6,445,555 | B1 | * | 9/2002 | Buckles et al. | 361/19 |
| 2002/0075701 | A1 | * | 6/2002 | Hubert et al. | 363/35 |
| 2002/0105231 | A1 | * | 8/2002 | Koeppe et al. | 307/64 |

FOREIGN PATENT DOCUMENTS

JP          01 235315          9/1989

* cited by examiner

*Primary Examiner*—Leo Picard
*Assistant Examiner*—Paul Rodriguez
(74) *Attorney, Agent, or Firm*—Fish & Richardson P.C.

(57) ABSTRACT

Power is provided from an energy storage device to a utility network based on a detected condition, such as a fault, in the network. Specifically, it is determined whether a fault on the utility network is a near fault or a far fault relative to the energy storage device. Whether a fault is classified as "near" or "far" is determined based on a voltage drop in the utility network. Power is then supplied to the utility network based on whether the fault is a near fault or a far fault.

25 Claims, 7 Drawing Sheets

METHOD AND APPARATUS FOR PROVIDING POWER TO A UTILITY NETWORK

INCORPORATION BY REFERENCE

The following applications are hereby incorporated by reference into the subject application as if set forth herein in full: (1) U.S. patent application Ser. No. 09/240,751, entitled "Electric Utility Network With Superconducting Magnetic Energy Storage", filed Jan. 29, 1999; (2) U.S. Provisional Application No. 60/117,784, entitled "Electric Utility Network With Superconducting Magnetic Energy Storage", filed Jan. 29, 1999; (3) U.S. patent application Ser. No. 09/449,505, entitled "Method And Apparatus For Discharging A Superconducting Magnet", filed Nov. 24, 1999; (4) U.S. patent application Ser. No. 09/449,436, entitled "Method And Apparatus For Controlling A Phase Angle", filed Nov. 24, 1999; (5) U.S. patent application Ser. No. 09/449,378, entitled "Capacitor Bank Switching", filed Nov. 24, 1999; (6) U.S. Provisional Application No. 60/167,377, entitled "Voltage Regulation Of A Utility Power Network", filed Nov. 24, 1999; and (7) U.S. patent application Ser. No. 09/449,435, entitled "Electric Utility System With Superconducting Magnetic Energy Storage", filed Nov. 24, 1999.

BACKGROUND OF THE INVENTION

This invention is directed to providing power from an energy storage device to a utility network.

Problems in a utility network, or "faults", (such as network device failures) can affect how power from an energy storage device is distributed throughout the network. In particular, faults tend to drain energy from the storage device, leaving less energy for distribution throughout other areas of the network and for recovering from voltage "sags" resulting from the fault.

Figure 1:
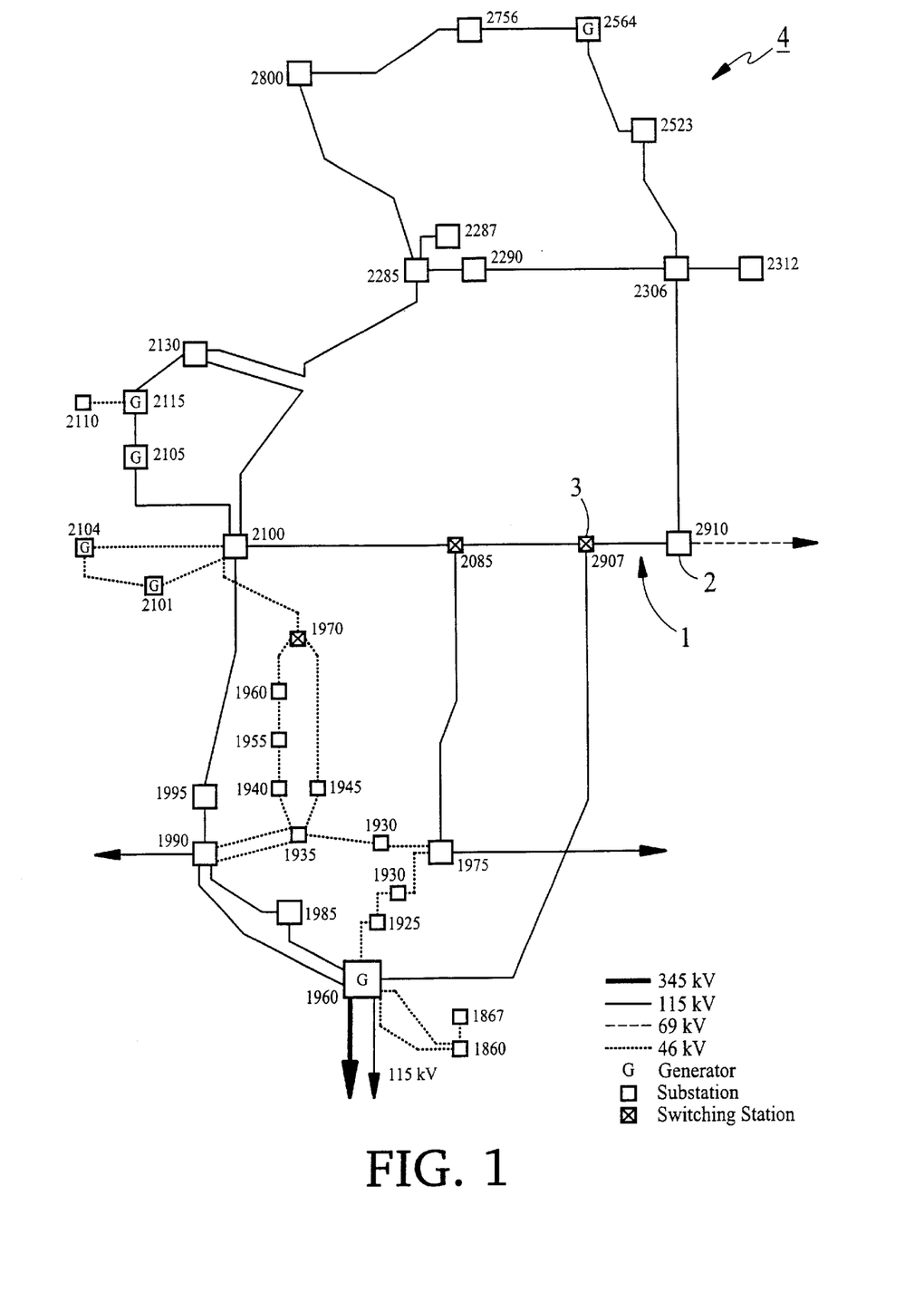
FIG. 1 is a view of a utility network.
Figure 2:
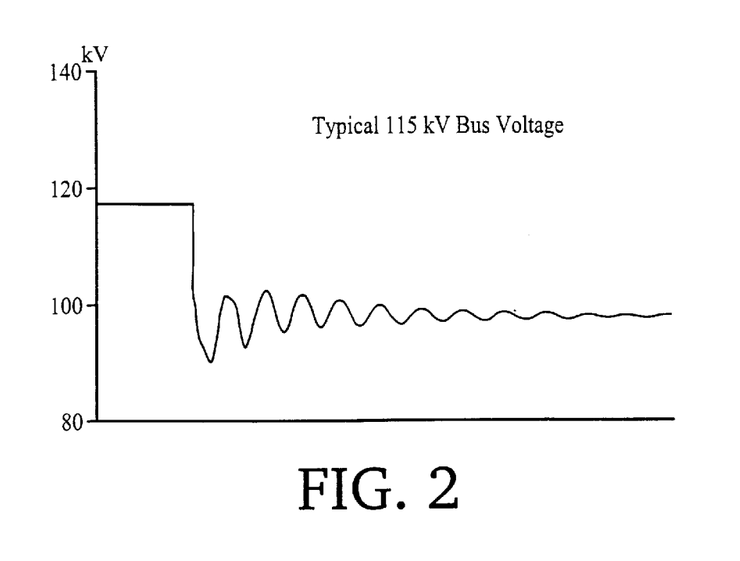
FIG. 2 is a voltage profile resulting from a fault on the utility network.

When a fault occurs in a utility network, momentary voltage depressions are experienced, which may result in voltage collapse or voltage instability on the network. To better understand the dynamics of a fault on the network, the sequence of events on the network due to a 3-phase fault will now be described. Referring to FIG. 1, assume that the fault occurs on a portion of a network 4 remote from segment 1. Segment 1 lies between a substation 2 and a switching station 3. Referring to FIG. 2, a voltage profile as a function of time at substation 2 due to the fault is shown. In this particular case, the voltage drops from a nominal 115 kV to about 90 kV. If the fault were to occur more closely to segment 1 or on segment 1 itself, the drop in voltage would be more severe, making the voltage approach zero.

In general, such a fault appears as an extremely large load materializing instantly on the utility network. In response to the appearance of this load, the network attempts to deliver a large amount of current to the load (i.e., the fault). Detector circuits associated with circuit breakers on the network detect the overcurrent situation immediately (within a few milliseconds). Activation signals from the detector circuits are sent to protective relays which initiate opening of the circuit. The mechanical nature of the relays generally requires 3 to 6 cycles (i.e., up to 100 milliseconds) to open. When the breakers open, the fault is cleared. However, opening of the breakers triggers a sequence of cascading events which, in the extreme, can cause the voltage on a portion of the utility network to collapse. Specifically, when the breakers open, the voltage is still low (i.e., almost zero) and, because a portion of the transmission network has, in effect, been removed, the impedance of the network dramatically increases causing the appearance of an artificially high load. In this state, the voltage is depressed and the current serving the load increases sharply. The sharp increase in current generates enormous losses in the network. In some cases, the voltage on the network may not return to normal, causing long-term voltage depression and the possible voltage collapse of the entire network. The potential for these voltage instability problems is further exacerbated as load requirements on the network increase.

One approach for addressing the foregoing problem is to construct additional transmission lines, thereby negating effects of the high losses and sharp increase in current flow caused by the opening of the circuit breakers. However, providing such additional lines is expensive and, in certain, settings, extremely difficult.

SUMMARY OF THE INVENTION

In general, in one aspect, the invention relates to providing power from an energy storage device to a utility network. The invention features determining whether a fault on the utility network comprises a near fault or a far fault relative to the energy-storage device, and supplying power to the utility network based on whether the fault is a near fault or a far fault.

Among the advantages of the invention may be one or more of the following. Faults that occur near to the energy storage device absorb large amounts of real power. Most of the real power from the energy storage device is thus drawn into an energy sink created by the fault. This is known as "feeding the fault". By contrast, faults that occur far from the energy storage device do not act as energy sinks, at least not to the same degree as near faults. By supplying power based on whether the fault is near or far, it is possible to adjust the power so that the energy storage device is not depleted unnecessarily. For example, if the fault is a near fault, reactive power may be supplied to the utility network (since real power would go to feed the fault, it is not supplied). If the fault is a far fault, both real and reactive power may be supplied to compensate for the far fault.

This aspect of the invention may include one or more of the following features/functions. The energy storage device may be a current storage device, such as a superconducting magnet. Both real and reactive power may be supplied to the utility network if the fault is a far fault. Reactive power may be supplied to the utility network if the fault is a near fault.

If a near fault is detected, real power may be supplied to the utility network after the near fault is at least partially cleared. In this case, only reactive power is supplied to the utility network before the near fault is at least partially cleared.

The fault is determined to be a near fault or a far fault by detecting a voltage drop in the utility network. If the voltage drops below a predetermined level, the fault is classified as a near fault. For example, if the voltage drops below a first percentage of the nominal voltage of the utility network, the fault is classified as a near fault. If the voltage drop is not below a predetermined level, the fault is classified as a far fault. For example, if the voltage drops to between the first percentage and a second percentage of the nominal voltage of the utility network, the fault is classified as a far fault.

In general, in another aspect, the invention features a system which includes an energy storage device and an inverter which provides energy from the energy storage device to a utility network. A controller controls the inverter to provide real and/or reactive power to the utility network based on a detected condition (e.g., a near or far fault) in the utility network.

Other features and advantages of the invention will become apparent from the following description and drawings.

DESCRIPTION OF THE PREFERRED EMBODIMENT

Figure 3:
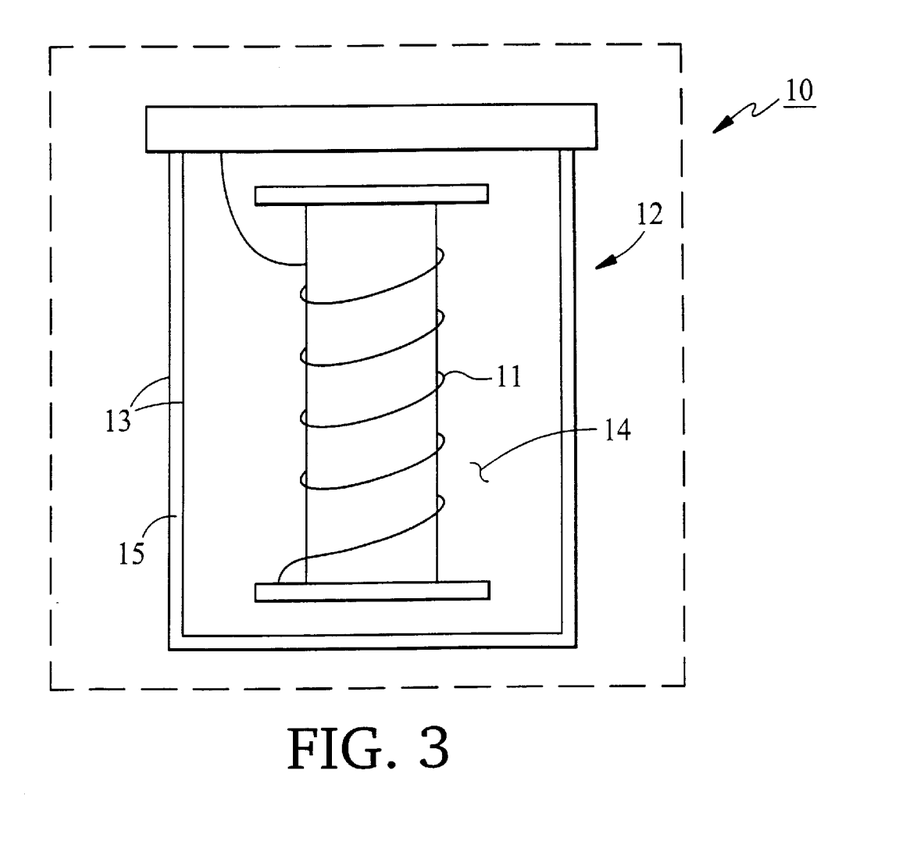
FIG. 3 is view of a superconducting magnet.

Referring to FIG. 3, a superconducting magnet 10, representing a superconducting magnetic energy storage ("SMES") device and cryogenic refrigerator unit, includes an superconducting magnetic coil positioned within a containment vessel 12 of the cryogenic refrigeration unit. In one embodiment, containment vessel 12 encloses magnetic coil 11 in liquid helium 14, and is fabricated from two austenitic stainless steel vessels 13 separated by a vacuum insulated space 15. In alternative embodiments, vessels 13 may be formed of stainless steel, aluminum, or epoxy fiberglass composite.

The cryogenic refrigeration unit includes one or more Gifford-McMahon type coolers (not shown) operating in concert to maintain cryogenic temperatures within vessel 12 and to re-liquify helium vapor building up within the vessel. Under normal operating conditions, helium (liquid or gaseous) does not circulate outside vessel 12. External, room temperature, refrigeration system gasses are not interchanged with the internal helium supply. Preferably, the system design permits continuous operation, with one or both coolers inoperable, for a minimum of 48 hours.

Superconducting magnetic coil 11 is wound with a low-temperature superconducting cable formed from niobium-titanium copper-based matrix wire that has been cabled into a mechanically stable form and insulated prior to winding. An alternative embodiment uses a coil fabricated of high temperature superconductor. Superconducting magnetic coil 11 also can be embodied with a high temperature superconductor cooled with an appropriate cryogen, such as helium or nitrogen. A suitable superconducting magnetic coil is available from American Superconductor Corporation of Westborough, Mass.

Figure 4:
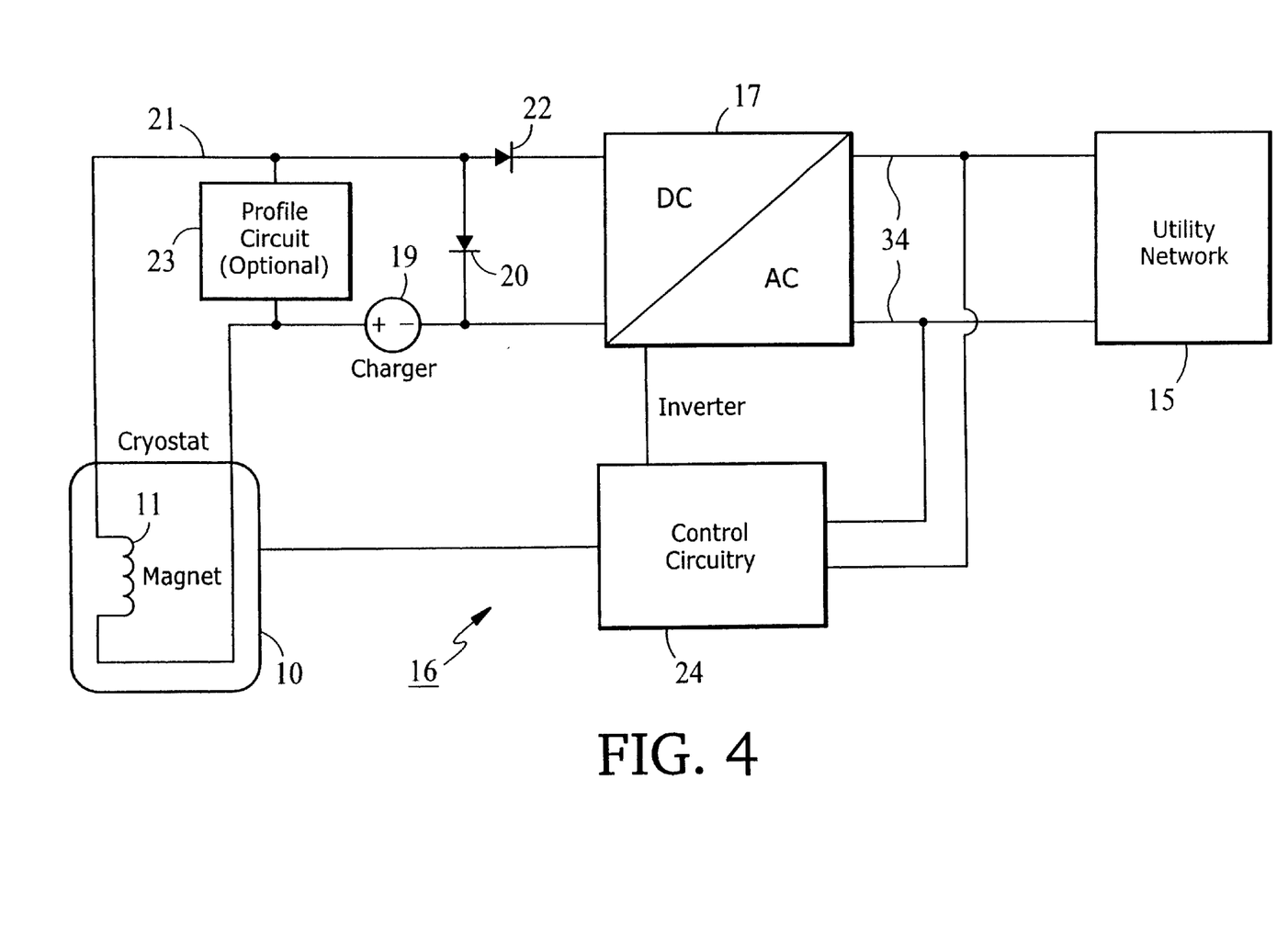
FIG. 4 is block diagram of circuitry for providing power from the superconducting magnet to a utility network.

FIG. 4 shows superconducting magnet 10 coupled to a utility network 15, such as that described in U.S. patent application Ser. No. 09/240,751 and U.S. Provisional Application No. 60/117,784. Utility network 15 includes interconnected transmission and distribution line elements and devices, as in FIG. 1, for transmitting and routing power.

Arranged between utility network 15 and magnet 10 is circuitry 16 which couples magnet 10 to utility network 15. Circuitry 16 includes a charger circuit 19 for charging magnet 10 using, e.g., power from utility network 15. Circuitry 16 also includes a AC-DC (Alternating Current-Direct Current) power inverter 17; however, other types of circuitry may be used instead of, or in addition to, such an inverter. Inverter 17 can be any type of AC-DC power converter, such as single level H-bridge, single level six-switch, multi-level, and stacked H-bridge inverters. In alternative embodiments, the functions of inverter 17 and magnet charger 19 may be performed by the same circuit.

Inverter 17 operates in a "discharge" mode, during which energy is provided from magnet 10 to utility network 15. In the "discharge" mode, inverter 17 converts DC power from superconducting magnet 10 into AC power, and provides that AC power to utility network 15. In this mode, gated switch 20 is open and diode switch 22 is closed to provide a short circuit along line 21 which allows current to flow from magnet 10 to utility network 15. Gated switch 20 may be an IGCT ("Integrated Gate Commutated Thyristor"), an IGBT ("Insulated Gate Bipolar Transistor"), a GTO ("Gate Turn-off Thyristor"), or any other type of semiconductor switch. If both diode switch 22 and IGCT switch 20 are open, current from magnet 10 flows through profiling circuit 23, where it is dissipated as heat. Profiling circuit 23 may include resistors and/or other circuit elements which act to dissipate current. Profiling circuit 23 is "optional" in the sense that it may or may not be included.

Figure 5:
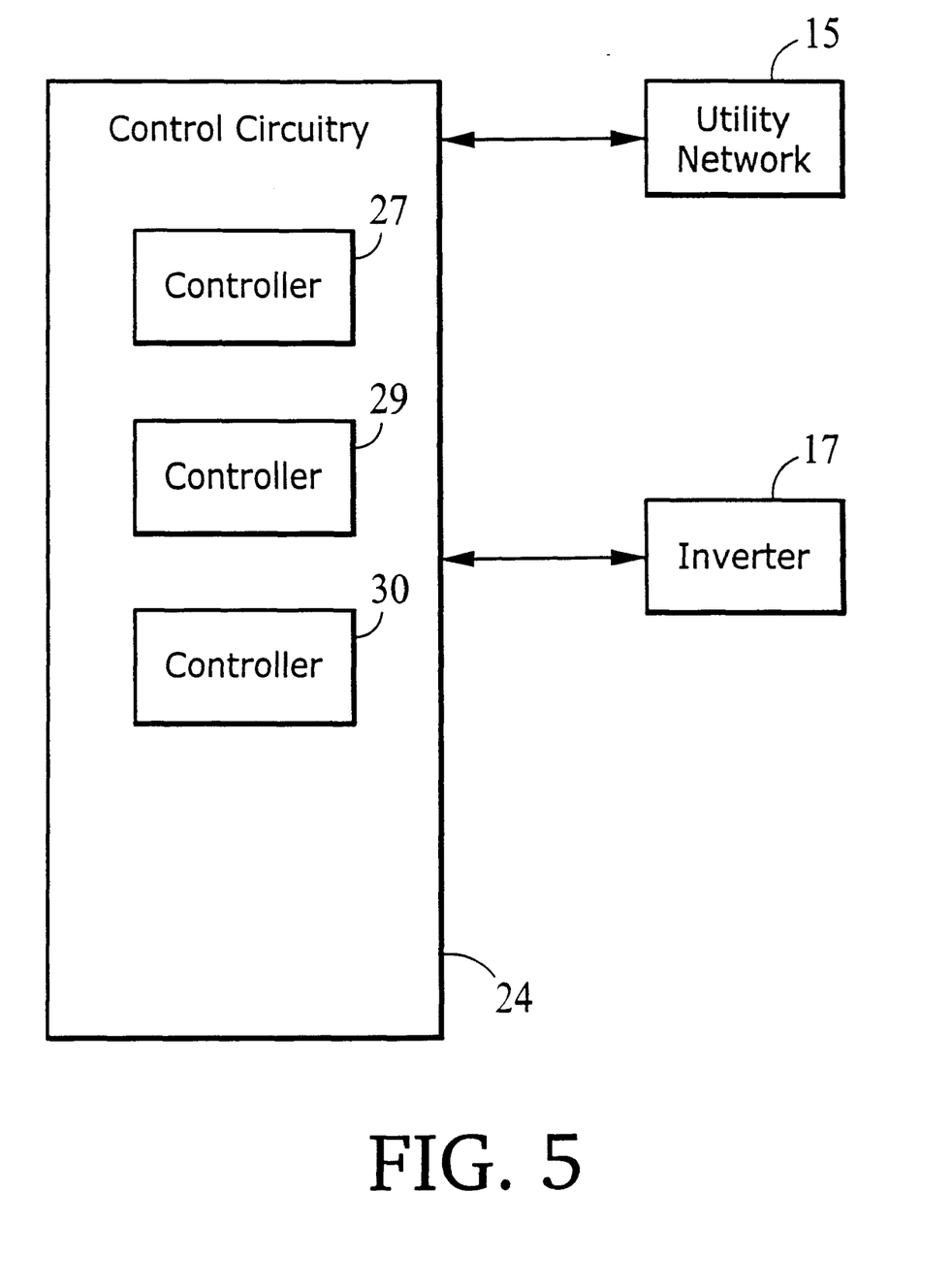
FIG. 5 is a block diagram of a control board used in the circuitry of FIG. 4.

Control circuitry 24 detects faults in utility network 15 and, in response, controls inverter 17 to provide appropriate power based on whether the detected fault is a near fault or a far fault (see below). As shown in FIG. 5, control circuitry 24 includes three controllers 27, 29 and 30 (e.g., microprocessors) on a single circuit board. In addition, appropriate driver circuits and analog-to-digital ("A/D") converters (not shown) may be provided. Other controllers (not shown) may also exist in the system.

Controller 27 executes computer instructions to control the amount and type of power (real versus reactive) that inverter 17 supplies to utility network 15. Controller 29 functions as the system controller, meaning that it executes computer instructions to detect voltages at utility network 15 and to provide this information to controller 27. Controller 30 records information obtained by controllers 27 and 29, formats that information, and provides it to a display (not shown). Although three controllers are shown, any number of controllers (e.g., one controller) can be used to perform the functions attributed to controllers 27, 29 and 30. The computer instructions executed in each controller may be stored in one or more memories (not shown) in circuitry 24 or an internal memory of each controller.

Figure 6:
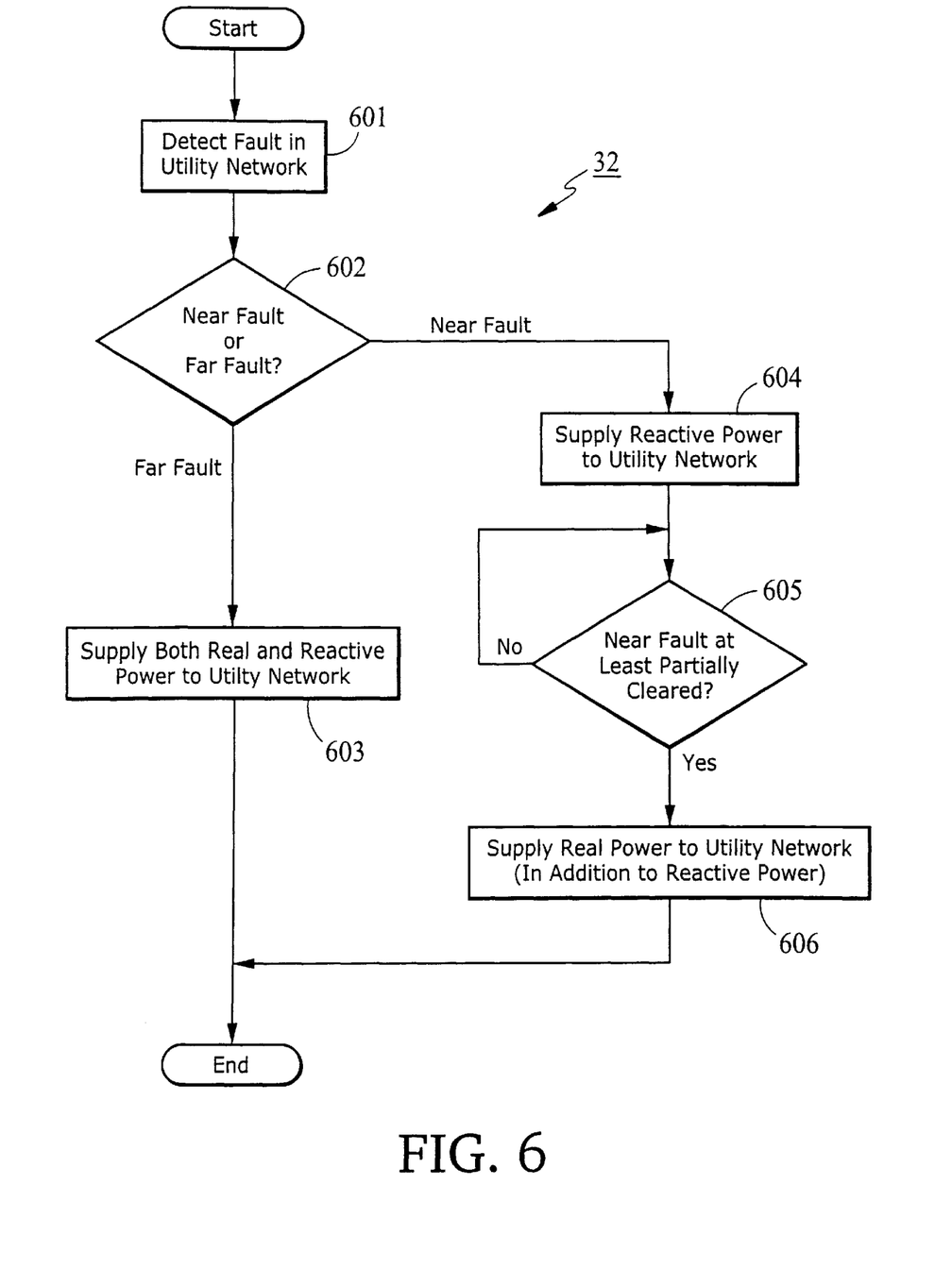
FIG. 6 is a flow diagram showing a process for providing power from the superconducting magnet to the utility network.

FIG. 6 shows a process 32, which is implemented in computer instructions executing on controller 27 and/or 29, for providing real power from magnet 10 to utility network 15 and for providing reactive power from inverter 17 to the utility network. Real power is provided from magnet 10 and reactive power is provided from utility network 15 to inverter 17, where it is phase-shifted, and provided back to utility network 15.

The amount of power that network 15 can absorb from magnet 10 is based on the utility voltage at the point where inverter 17 attaches to network 15. During a fault, this voltage is depressed. The maximum amount of power, $P_{MAX}$, that network 15 can absorb from magnet 10 is determined based on this voltage, as follows $$P_{MAX} = N * pu * V_{nom} * (I_{inverter(max)} * 3^{1/2})$$

where N is the number of three-phase inverters in utility network 15, pu is the fraction of the nominal utility voltage at inverter 17, $V_{nom}$ is the nominal RMS ("Root Mean Square") output voltage of inverter 17, $I_{inverter(max)}$ is the maximum inverter RMS output current from inverter 17 on a per-phase basis, and $3^{1/2}$ represents 3-phase power. So long as the amount of power absorbed, namely $P_{max}$, is greater than or equal to the amount of power that magnet 10 injects into utility network 15 $P_{inj}$, magnet 10 can usefully source real power into the utility network. When $P_{max}<P_{inj}$, the supply of real power from magnet 10 is either inhibited or modulated, as described in process 32 below.

Process 32 begins by detecting (601) a fault in utility network 15. Faults, such as short circuits, affect the voltage on utility network 15. Specifically, a voltage drop occurs on utility network 15 because power between two points is diverted to ground or between phases through the fault. Process 32 thus detects faults in utility network 15 by detecting a voltage drop on the utility network at the output 34 of inverter 17 (FIG. 4). The amount of this voltage drop is used to determine whether a detected fault is a near fault or a far fault.

Figure 7:
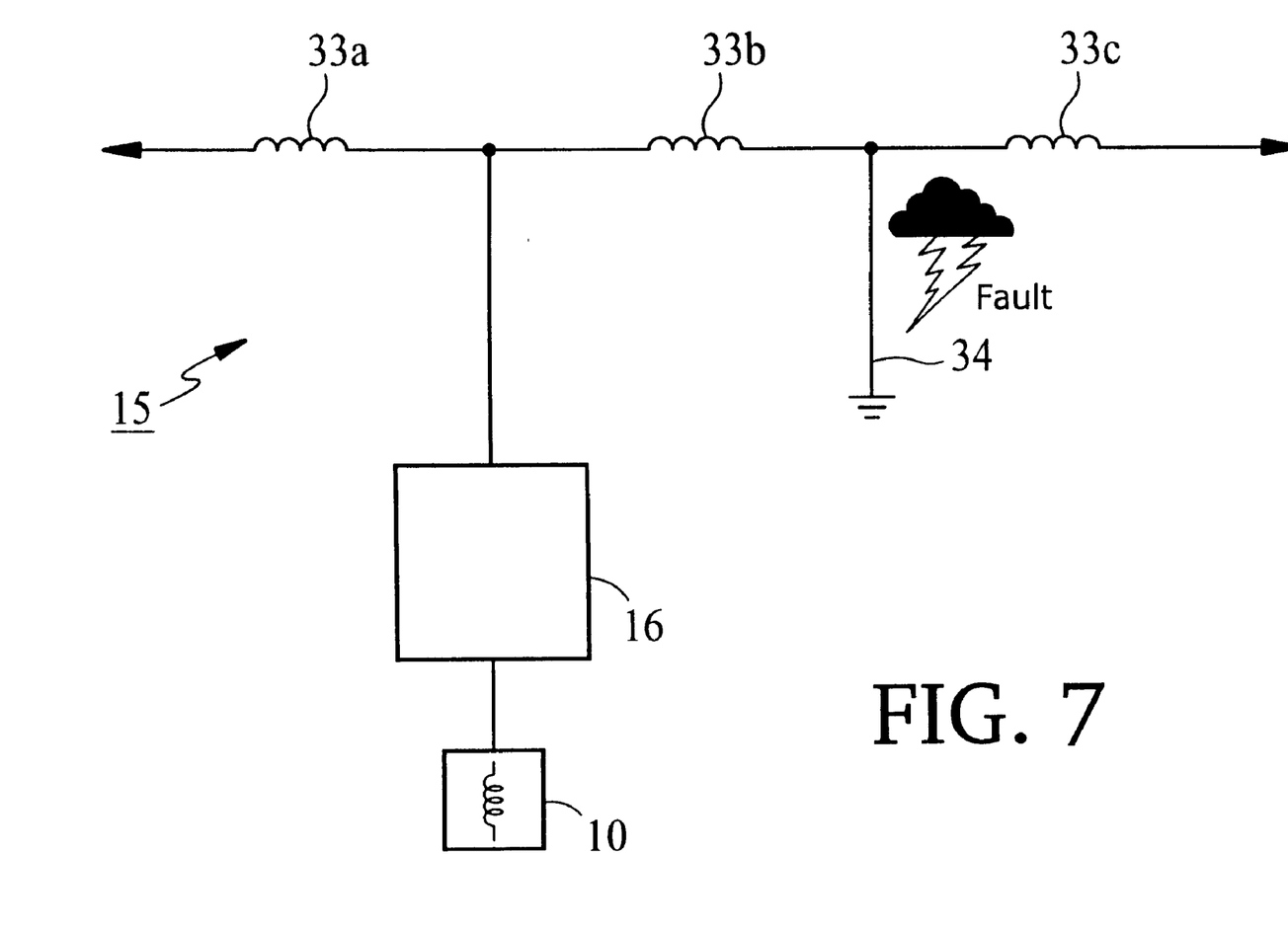
FIG. 7 is a block diagram showing a fault in the utility network.

A near fault is a fault that occurs fairly close (electrically-speaking) to superconducting magnet 10. For example, FIG. 7 shows a view of utility network 15, which includes line distribution elements 33a, 33b and 33c, superconducting magnet 10, and its associated control circuitry 16 (described above). A fault that occurs at point 34 may be characterized as a far fault if the resulting voltage drop is relatively small. If the voltage drop resulting from the fault is relatively high, the fault is classified as a near fault. Thus, whether a fault is classified as "near" or "far" may have nothing to do with the physical proximity of the fault to magnet 10.

In 602, process 32 measures the voltage at the output of inverter 17. Process 32 examines the voltage value obtained in 602 to determine if the voltage drop is above or below predetermined levels. Based on this, process 32 controls inverter 17 to output either real power or both real and reactive power. In this embodiment, if the voltage drops to between 50% and 90% of a nominal voltage of utility network 15 (a value that process 32 knows beforehand), the fault is classified as a far fault and will not absorb an inordinate amount of real power from superconducting magnet 10. If the voltage drops below 50% of the nominal (e.g., typical) voltage of the utility network, then the fault is classified as a near fault, since it will absorb an inordinate amount of power from superconducting magnet 10. It is noted that the 50% and 90% numbers were chosen for convenience and that voltage drops other than these may be used to classify faults as near or far depending upon the particular circumstances. These voltage drops can be set beforehand in, for example, control circuitry 24.

If the fault is far, process 32 controls inverter 17 to supply (603) both real and reactive power to utility network 15. As noted above, the real power is supplied from magnet 10 and the reactive power may be transferred from utility network 15 to inverter 17 and then transferred back from the inverter to the utility network. If the fault is near, process 32 controls inverter 17 to supply (604) primarily reactive power to utility network 15.

Figure 8A:
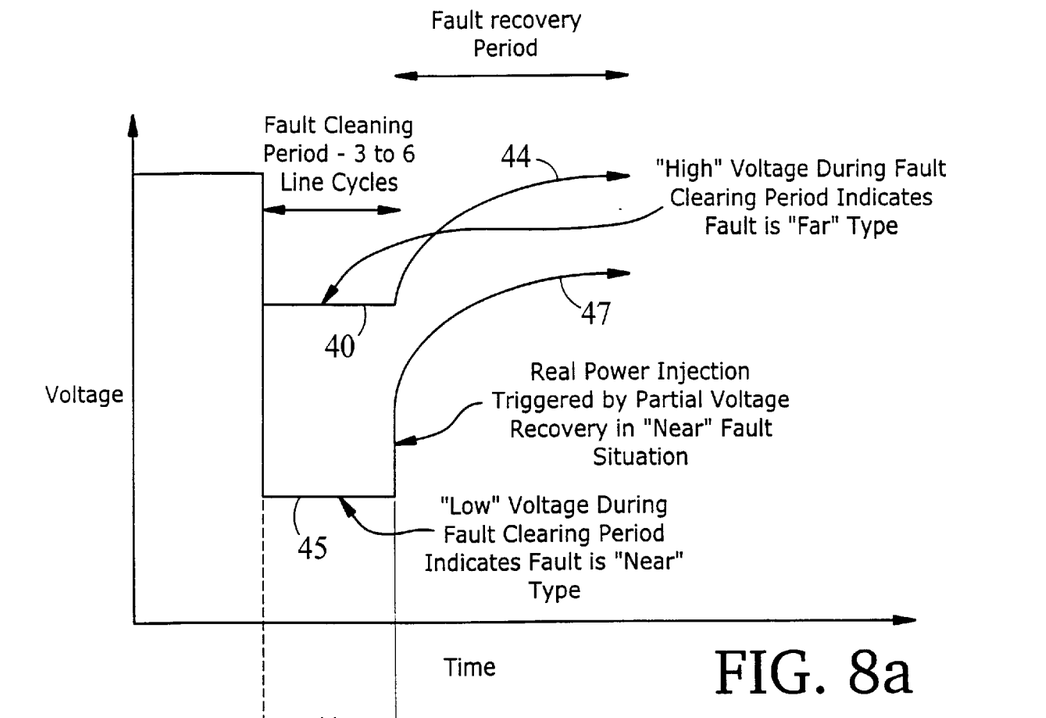
FIGS. 8a, 8b and 8c are graphs showing how power is supplied according to the process of FIG. 6.
Figure 8B:
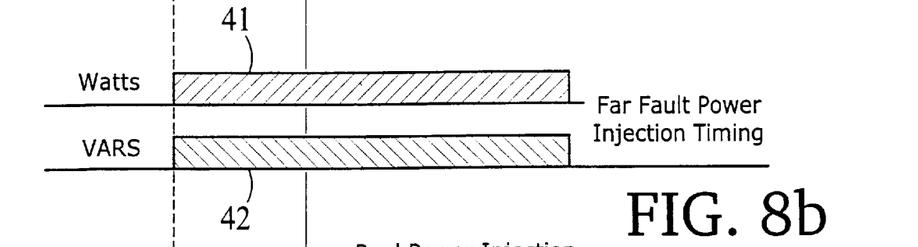
Figure 8C:
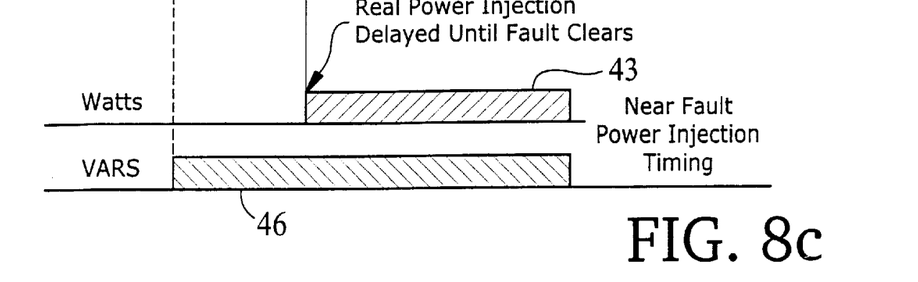

Referring to the graphs of FIGS. 8a, 8b and 8c, if the fault is a far fault, the resulting voltage drop 40 is relatively small (FIG. 8a). Consequently, process 32 controls inverter 17 to output both real power (Watts) 41 and reactive power (VARS) 42 to utility network 15 (FIG. 8b). This power is supplied until utility network 15 is at full, or substantially full, power (44 of FIG. 8a).

If the fault is a near fault, the resulting voltage drop 45 is large (relative to the far fault). Accordingly, process 32 controls inverter 17 to output primarily reactive power (VARS) 46 while the fault is present (FIG. 8c). By delaying real power injection in this manner, the maximum amount of stored energy in magnet 10 is reserved until the fault clears. As a result, when energy is supplied from magnet 10, it can be supplied quickly resulting in quicker utility voltage recovery than would otherwise be the case.

Referring back to FIG. 6, if the fault is classified as a near fault, process 32 waits (605) until the fault is at least partially cleared before supplying real power to utility network 15. Faults are cleared by the utility or by means other than process 32. Process 32 determines whether a fault has been at least partially cleared based on voltage measurements on utility network 15. Clearing of the fault may be evidenced, e.g., by a voltage measurement that is 50% (or above) of the nominal voltage of utility network 15. Other values, however, may be used to evidence clearing of the fault or, alternatively, process 32 may wait until the fault is fully cleared (which usually takes three to six power line cycles, as noted in FIG. 8a).

In any case, once the fault has been cleared, process 32 controls inverter 17 to supply (606) real power 43 to utility network 15 (in addition to the reactive power already being supplied). This is shown in FIG. 8c. The real and reactive power are supplied until utility network 15 is near a nominal voltage (e.g., 90%) (47 of FIG. 8a).

In the case of both near and far faults, once utility network 15 is near the nominal voltage, process 32 may stop the flow of power from superconducting magnet 10 to utility network 15. Real power flow may also cease when the magnet is discharged to a predetermined cutoff point. The flow may then recommence if the need arises. Although faults to ground are used above to illustrate the process, the invention applies equally well to phase-to-phase faults.

Other embodiments not described herein are also within the scope of the following claims. For example, the invention can be used in connection with any energy storage device, such as flywheels, fuel cells, supercapacitors, etc., and not just superconducting magnets. Also, combinations of hardware and/or software not described herein may be used. The invention may be used in a DSMES ("Distributed Superconducting Magnetic Energy Storage System"), such as that described in U.S. patent application Ser. No. 09/240, 751 and that described in U.S. Provisional Application No. 60/117,784.

What is claimed is:

1. A method of providing power from an energy storage device to a utility network, comprising:
   determining whether a fault on the utility network comprises a high voltage drop fault or a low voltage drop fault, the high voltage drop fault causing a greater voltage drop on the utility network than the low voltage drop fault; and
   supplying power to the utility network based on whether the fault is a high voltage drop fault or a low voltage drop fault, wherein reactive power only is supplied initially in the case of a high voltage drop fault.

2. The method of claim 1, wherein supplying comprises supplying both real and reactive power to the utility network if the fault is a low voltage drop fault.

3. The method of claim 1, further comprising:
   supplying real power to the utility network after a high voltage drop fault has been at least partially cleared;
   wherein only reactive power is supplied to the utility network before the high voltage drop fault is at least partially cleared.

4. The method of claim 1, wherein determining whether the fault comprises a high voltage drop fault or a low voltage drop fault comprises detecting a voltage drop on the utility network.

5. The method of claim 4, wherein:
if the voltage drop is below a predetermined level, the fault is classified as a high voltage drop fault; and
if the voltage drop is not below a predetermined level, the fault is classified as a low voltage drop fault.

6. The method of claim 5, wherein:
if the voltage drop is between a first percentage and a second percentage of a nominal voltage of the utility network, the fault is classified as a low voltage drop fault; and
if the voltage drop is below the first percentage of the nominal voltage of the utility network, the fault is classified as a high voltage drop fault;
wherein the second percentage is higher than the first percentage.

7. The method of claim 1, wherein the energy storage device comprises a current-mode energy storage device.

8. The method of claim 7, wherein the current-mode energy storage device comprises a superconducting magnet.

9. An apparatus for providing power from an energy storage device to a utility network, comprising:
an inverter which supplies power to the utility network; and
a controller which (i) determines whether a fault on the utility network comprises a high voltage drop fault or a low voltage drop fault, the high voltage drop fault causing a greater voltage drop on the utility network than the low voltage drop fault, and (ii) controls the inverter to supply power to the utility network based on whether the fault is a high voltage drop fault or a low voltage drop fault, the controller controlling the inverter to initially supply reactive power only in the case of a high voltage drop fault.

10. The apparatus of claim 9, wherein the controller controls the inverter to supply both real and reactive power to the utility network if the fault is a low voltage drop fault.

11. The apparatus of claim 9, wherein the controller controls the inverter to (i) supply real power to the utility network when a high voltage drop fault is at least partially cleared, and (ii) supply only reactive power to the utility network before the high voltage drop fault is at least partially cleared.

12. The apparatus of claim 9, wherein the controller determines whether the fault comprises a high voltage drop fault or a low voltage drop fault based on a detected voltage drop in the utility network.

13. The apparatus of claim 12, wherein:
if the voltage drop is below a predetermined level, the controller determines that the fault is a high voltage drop fault; and
if the voltage drop is not below a predetermined level, the controller determines that the fault is a low voltage drop fault.

14. The apparatus of claim 13, wherein:
if the voltage drop is between a first percentage and a second percentage of a nominal voltage of the utility network, the controller determines that the fault is a low voltage drop fault; and
if the voltage drop is below the first percentage of the nominal voltage of the utility network, the controller determines that the fault is a high voltage drop fault;
wherein the second percentage is higher than the first percentage.

15. The apparatus of claim 9, wherein the energy storage device comprises a current-mode energy storage device.

16. The apparatus of claim 15, wherein the current-mode energy storage device comprises a superconducting magnet.

17. A computer program stored on a computer-readable medium for controlling power supplied from an energy storage device to a utility network, the computer program comprising instructions that cause a computer to:
determine whether a fault on the utility network comprises a high voltage drop fault or a low voltage drop fault, the high voltage drop fault causing a greater voltage drop on the utility network than the low voltage drop fault; and
control a supply of power to the utility network based on whether the fault is a high voltage drop fault or a low voltage drop fault, wherein reactive power only is supplied initially in the case of a high voltage drop fault.

18. The computer program of claim 17, wherein controlling comprises causing both real and reactive power to be supplied to the utility network if the fault is a low voltage drop fault.

19. The computer program of claim 17, wherein controlling comprises:
causing real power to be supplied to the utility network when the high voltage drop fault is at least partially cleared; and
causing only reactive power to be supplied to the utility network before the high voltage drop fault is at least partially cleared.

20. The computer program of claim 17, wherein determining whether the fault comprises a high voltage drop fault or a low voltage drop fault is based on a detected voltage drop on the utility network.

21. The computer program of claim 20, wherein:
if the voltage drop is below a predetermined level, the fault is classified as a high voltage drop fault; and
if the voltage drop is not below a predetermined level, the fault is classified as a low voltage drop fault.

22. The computer program of claim 21, wherein:
if the voltage drop is between a first percentage and a second percentage of a nominal voltage of the utility network, the fault is classified as a low voltage drop fault; and
if the voltage drop is below the first percentage of the nominal voltage of the utility network, the fault is classified as a high voltage drop fault;
wherein the second percentage is higher than the first percentage.

23. The computer program of claim 17, wherein the energy storage device comprises a current-mode energy storage device.

24. The computer program of claim 23, wherein the current-mode energy storage device comprises a superconducting magnet.

25. A method of providing power from an energy storage device to a utility network, comprising:
determining a voltage on the utility network; and
supplying power to the utility network based on the voltage;
wherein (i) if the voltage is between a first percentage and a second percentage of a nominal voltage of the utility network, real and reactive power are supplied to the utility network, and (ii) if the voltage is below the first percentage of the nominal voltage of the utility network, reactive power only is supplied to the utility network, the second percentage being higher than the first percentage.

* * * * *